United States Patent
Cooke et al.

(10) Patent No.: US 7,145,149 B2
(45) Date of Patent: Dec. 5, 2006

(54) FLEXIBLE COMPOSITE RADIATION DETECTOR

(75) Inventors: D. Wayne Cooke, Santa Fe, NM (US); Bryan L. Bennett, Los Alamos, NM (US); Ross E. Muenchausen, Los Alamos, NM (US); Debra A. Wrobleski, Los Alamos, NM (US); Edward B. Orler, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 155 days.

(21) Appl. No.: 10/946,025

(22) Filed: Sep. 21, 2004

(65) Prior Publication Data

US 2006/0060823 A1    Mar. 23, 2006

(51) Int. Cl.
*C09K 11/08* (2006.01)
(52) U.S. Cl. .................................. 250/361 R
(58) Field of Classification Search ............. 250/361 R
See application file for complete search history.

(56) References Cited

U.S. PATENT DOCUMENTS

| | | | |
|---|---|---|---|
| 4,127,499 A | 11/1978 | Chen et al. | |
| 4,185,201 A | 1/1980 | Stevels | |
| 4,230,510 A | 10/1980 | Cusano et al. | |
| 4,362,946 A | 12/1982 | Cusano et al. | |
| 4,647,781 A | 3/1987 | Takagi | |
| 4,692,266 A | 9/1987 | Costa et al. | |
| 4,883,956 A | 11/1989 | Melcher et al. | |
| 4,958,080 A | 9/1990 | Melcher | |
| 5,025,151 A | 6/1991 | Melcher | |
| 5,264,154 A | 11/1993 | Akiyama et al. | |
| 5,568,532 A | 10/1996 | Majewski et al. | |
| 5,606,638 A | 2/1997 | Tymianski et al. | |
| 5,607,774 A * | 3/1997 | Dahlquist et al. | ........... 428/447 |
| 6,207,077 B1 | 3/2001 | Burnell-Jones | |
| 6,323,489 B1 | 11/2001 | McClellan | |
| 6,448,566 B1 | 9/2002 | Riedner et al. | |
| 6,563,120 B1 | 5/2003 | Baldwin et al. | |
| 6,599,444 B1 | 7/2003 | Burnell-Jones | |
| 6,689,293 B1 | 2/2004 | McClellan et al. | |
| 2004/0262536 A1* | 12/2004 | Van den Bergh et al. | ...................... 250/483.1 |

OTHER PUBLICATIONS

G. D. Stevens, et al., "Optical response of cerium-doped lutetium oxyorthosilicate coatings at shocked surfaces." American Institute of Physics, Review of Scientific Instruments, vol. 75, No. 2 (Feb. 2004) pp. 462-466.*

Brandle et al., "Czochralski Growth of Rare-Earth Orthosilicates ($Ln_2SiO_5$)," Journal of Crystal Growth vol. 79 (1986) pp. 308-315.

Loutts et al., "Czochralski Growth and Characterization of $(Lu_{1-x}Gd_x)_2SiO_5$ Single Crystals for Scintillators," Journal of Crystal Growth vol. 174 (1997) pp. 331-336.

(Continued)

*Primary Examiner*—Constantine Hannaher
(74) *Attorney, Agent, or Firm*—Samuel L. Borkowsky

(57) ABSTRACT

A flexible composite scintillator was prepared by mixing fast, bright, dense rare-earth doped powdered oxyorthosilicate (such as LSO:Ce, LSO:Sm, and GSO:Ce) scintillator with a polymer binder. The binder is transparent to the scintillator emission. The composite is seamless and can be made large and in a wide variety of shapes. Importantly, the composite can be tailored to emit light in a spectral region that matches the optimum response of photomultipliers (about 400 nanometers) or photodiodes (about 600 nanometers), which maximizes the overall detector efficiency.

18 Claims, 4 Drawing Sheets

OTHER PUBLICATIONS

Shoudu et al., "Czochralski Growth of Rare-Earth Orthosilicates—$Y_2SiO_5$ Single Crystals," Journal of Crystal Growth, vol. 197 (1999) pp. 901-904.

Shmulovich et al., "Single-Crystal Rare-Earth-DopedYttrium Orthosilicate Phosphors," J. Electrochemical Society (1988) pp. 3141-3151.

Rodnyi, "Physical Process in Inorganic Scintillators," CRC Press (1997) p. 50.

Melcher et al., "Czochralski Growth of Rare Earth Oxyorthosilicate Single Crystals," Journal of Crystal Growth vol. 128 (1993) pp. 1001-1005.

* cited by examiner

FLEXIBLE COMPOSITE RADIATION DETECTOR

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to radiation detection and more particularly to a flexible composite radiation detector that includes rare earth doped oxyorthosilicate powder mixed with a polymer binder.

BACKGROUND OF THE INVENTION

Phosphors are currently used in many important devices such as fluorescent lamps, RGB (red, green, blue) screens, lasers, and crystal scintillators for radiation detectors, radiographic imaging and nuclear spectroscopy. Perhaps the most important property of any phosphor is its brightness, i.e. its quantum efficiency, which is the ratio of the number of photons emitted by the phosphor to the number of photons absorbed. Other important properties include the spectral region of maximum emission (which should match commonly-used photodetectors), optical absorption (minimum self-absorption is desired), decay time of the emission (for some applications fast is desired), and the density. In general, superior scintillators exhibit high quantum efficiency, good linearity of the spectral emission with respect to incident energy, high density, fast decay time, and minimal self-absorption. Specific scintillator applications determine the choice of phosphor. For example, scintillators used for active and passive radiation detection require high density, and brightness, whereas scintillators used for radiographic imaging also require fast decay time.

An exceptionally good scintillator is cerium-activated lutetium oxyorthosilicate. This material has been conveniently abbreviated in the art as either LSO:Ce or Ce:LSO, and will be referred to herein as LSO:Ce. LSO:Ce is a crystalline solid that includes a host lattice of lutetium oxyorthosilicate ($Lu_2SiO_5$ abbreviated LSO) that is activated by a small amount of the rare-earth metal dopant cerium (Ce). Cerium is an excellent activator because both its ground and excited states lie within the band gap of about 6 eV of the host LSO lattice. LSO:Ce is very bright, i.e. it has a very high quantum efficiency. LSO:Ce also has a high density (7.4 $gm/cm^3$), a fast decay time (about 40 nanoseconds), a band emission maximum near 420 nanometers, and minimal self-absorption. Oxyorthosilicate scintillators, including LSO:Ce, have been documented in the following reports and patents.

"Czochralski Growth of Rare-Earth Orthosilicates ($Ln_2SiO_5$)" by C. D. Brandle et al (Journal of Crystal Growth, vol. 79, p. 308–315, 1986), incorporated by reference herein, describes yttrium oxyorthosilicate (YSO) activated with Ce, Pr, Nd, Sm, Gd, Tb, Er, Tm, or Yb. Shmulovich et al. (Journal of the Electrochemical. Society:Solid-State Science and Technology, vol. 135, no. 12, p. 3141–3151, 1988), incorporated by reference herein, describes single crystals of rare-earth activated YSO (prepared according to aforementioned C. D. Brandle et al.) that include a green phosphor containing YSO activated with Tb and Gd, and a red phosphor containing YSO activated with Tb and Eu.

"Czochralski Growth of Rare Earth Oxyorthosilicate Single Crystals" by C. L. Melcher et al. (Journal of Crystal Growth, vol. 128, p. 1001–1005, 1993), incorporated by reference herein, describes the Czochralski preparation of single crystals of GSO:Ce, LSO:Ce, and YSO:Ce.

"Czochralski Growth and Characterization of $(Lu_{1-x}Gd_x)_2SiO_5$" by G. B. Loutts et al. (Journal of Crystal Growth, vol. 174, p. 331–336, 1997), incorporated by reference herein, describes the preparation and properties of single crystals of cerium-activated oxyorthosilicates having a crystal lattice of lutetium and gadolinium.

U.S. Pat. No. 4,647,781 to K. Takagi et al. entitled "Gamma Ray Detector," which issued on Mar. 3, 1987, incorporated by reference herein, describes a cerium-activated oxyorthosilicate scintillator having the general formula $Gd_{2(1-x-y)}Ln_{2x}Ce_{2y}SiO_5$ wherein Ln is yttrium and/or lanthanum, wherein $0 \leq x \leq 0.5$, and wherein $1 \times 10^{-3} \leq y \leq 0.1$.

U.S. Pat. No. 5,264,154 to S. Akiyama et al. entitled "Single Crystal Scintillator," which issued on Nov. 23, 1993, incorporated by reference herein, describes a single crystal cerium-activated oxyorthosilicate scintillator having the general formula $Gd_{2-(x+y)Lnx}Ce_ySiO_5$ wherein Ln is Sc, Tb, Lu, Dy, Ho, Er, Tm, or Yb, wherein $0.03 \leq x \leq 1.9$, and wherein $0.001 \leq y \leq 0.2$.

U.S. Pat. No. 6,689,298 to Kenneth J. McClellan et al. entitled "Crystalline Rare-Earth Activated Oxyorthosilicate Phosphor," which issued on Feb. 10, 2004, incorporated by reference herein, describes a variety of single crystal phosphors such as lutetium yttrium phosphor (host lattice LYSO), lutetium gadolinium phosphor (host lattice LGSO), and gadolinium yttrium phosphor (host lattice GYSO) that have been doped with rare earth dopants Sm, Tb, Tm, Eu, Yb, and Pr.

U.S. Pat. No. 6,323,489 to K. McClellan entitled "Single Crystal Scintillator," which issued on Nov. 27, 2001, incorporated by reference herein, describes a single crystal, cerium activated oxyorthosilicate scintillator having the having the general formula $Lu_{(2-x-z)}Y_xCe_zSiO_5$, wherein $0.05 \leq x \leq 1.95$ and $0.001 \leq z \leq 0.02$. The host lattice of this material is referred to herein as LYSO.

U.S. Pat. No. 4,958,080 to C. L. Melcher entitled "Lutetium Orthosilicate Single Crystal Scintillator Detector," which issued on Sep. 18, 1990, describes an x-ray detector employing a transparent, single crystal of cerium-activated lutetium oxyorthosilicate (LSO:Ce).

While the scintillator properties of LSO:Ce are exceptional, high-quality single crystals are difficult and expensive to prepare. The high cost, which is at least partly due to the high cost of starting materials (high purity $Lu_2O_3$ powder) and equipment (iridium crucibles for containing the $Lu_2O_3$ powder that melts at about 2150 degrees Celsius), and the tendency of the crystal boule to form cracks that limit the amount of usable single crystal from the boule, limits efforts to develop other types of crystals with an LSO host lattice.

Large area radiation detectors made from single crystals are difficult, time consuming, and expensive to prepare. Preparation typically involves cutting single-crystal fragments from the boule, polishing the ends of the fragments, and gluing them together to form a monolith. The seams between adjacent fragments may be deleterious for radiographic imaging.

Clearly, there remains a need for less expensive radiation detectors that employ high performance scintillators.

Therefore, an object of this invention is to provide a less expensive radiation detector that employs crystalline, rare-earth-activated oxyorthosilicates.

Another object of this invention is to provide a large area, seamless, flexible radiation detector.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a flexible composite including solid mixture of rare earth doped oxyorthosilicate powder mixed with a polymer binder.

The invention also includes a radiation detector. The radiation detector includes a seamless flexible composite that includes rare earth doped oxyorthosilicate powder mixed with a polymer binder, and a photodetector optically coupled to the composite for detecting light from the rare earth doped oxyorthosilicate powder.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION

Figure 1:
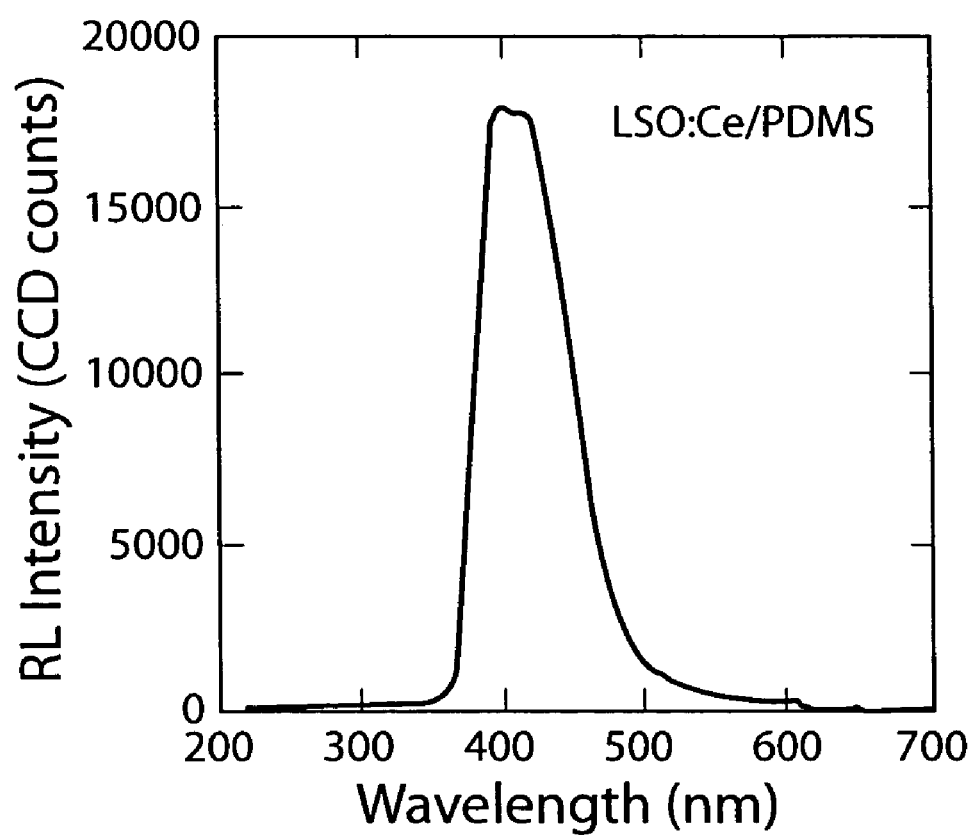
FIG. 1 shows an emission spectrum of a flexible composite of the invention that includes LSO:Ce in polydimethylsiloxane (PDMS).

The invention includes radiation detectors that employ a seamless flexible scintillating composite that can detect photons (x-rays, gamma rays, etc.) and particles (protons, neutrons, etc.). Detectors of this invention employ fast, bright, dense rare-earth doped powdered oxyorthosilicate (such as LSO:Ce, LSO:Sm, and GSO:Ce) that is incorporated with a flexible polymer binder that is transparent to the scintillator emission. The thickness of the flexible composite is easily controllable and can be adjusted depending on the particular application. By altering the amount of the powdered doped oxyorthosilicate used, the effective density of the scintillator can be adjusted. A preferred amount of the rare earth doped oxyorthosilicate of this invention is in the range from greater than about zero weight percent to about 50 weight percent.

The composite is relatively inexpensive (compared to the cost of preparing single crystals) because single crystals are not required. The doped oxyorthosilicate powder may be prepared by pulverizing the cracked portions of a boule that would be unusable for devices that require intact single crystals, or by some other method for preparing the powder.

The area of the composite can be made large and in a wide variety of shapes using known processing techniques commonly used for preparing films, coatings, tubes, rods (fibers), and other structures. Importantly, the composite can be tailored to emit light in a spectral region that matches the optimum response of photomultipliers (about 400 nanometers) or photodiodes (about 600 nanometers), which maximizes the overall efficiency of the radiation detector (which includes the typical detector elements such as power supplies, current meters, photomultiplier tubes, photodiodes, etc.).

Scintillators used in radiation detectors of this invention are bright and dense; the brightness provides the detector with optimum light detection, and the high density provides the detector with stopping power for the x-rays, gamma-rays, neutrons, protons, or the like. Rare-earth doped oxyorthosilicates used with this invention are bright and dense scintillators that are currently employed in radiographic imaging systems.

Scintillators are used for active and passive radiation detectors and/or nuclear spectroscopy. Preferred applications for detectors of this invention are related to active radiation detection.

The scintillating materials used with the composite of this invention may be prepared by grinding bulk crystals into powder. Preferred particle diameters are in the range of from about 40 nanometers to about 500 microns. The powder is uniformly dispersed into a polymer binder.

Preferred host oxyorthosilicate lattices used with this invention include lutetium oxyorthosilicate (LSO), gadolinium oxyorthosilicate (GSO), yttrium oxyorthosilicate (YSO), lutetium yttrium oxyorthosilicate (LYSO), gadolinium yttrium oxyorthosilicate (GYSO), and lutetium gadolinium oxyorthosilicate (LGSO). Preferred dopants with these host lattices include Ce, Sm, Tb, Tm, Eu, Yb, and Pr. Mixtures of these dopants into a host lattice can also be used.

A relatively inexpensive radiation detector embodiment of this invention was prepared by dispersing about 1 percent by weight of LSO:Ce powder with an average particle size of about 40 microns into polydimethylsiloxane. The result was a large area, flexible radiation detector with good light output, fast decay time, and relatively high density. The EXAMPLES section (vide infra) provides more details.

Figure 2:
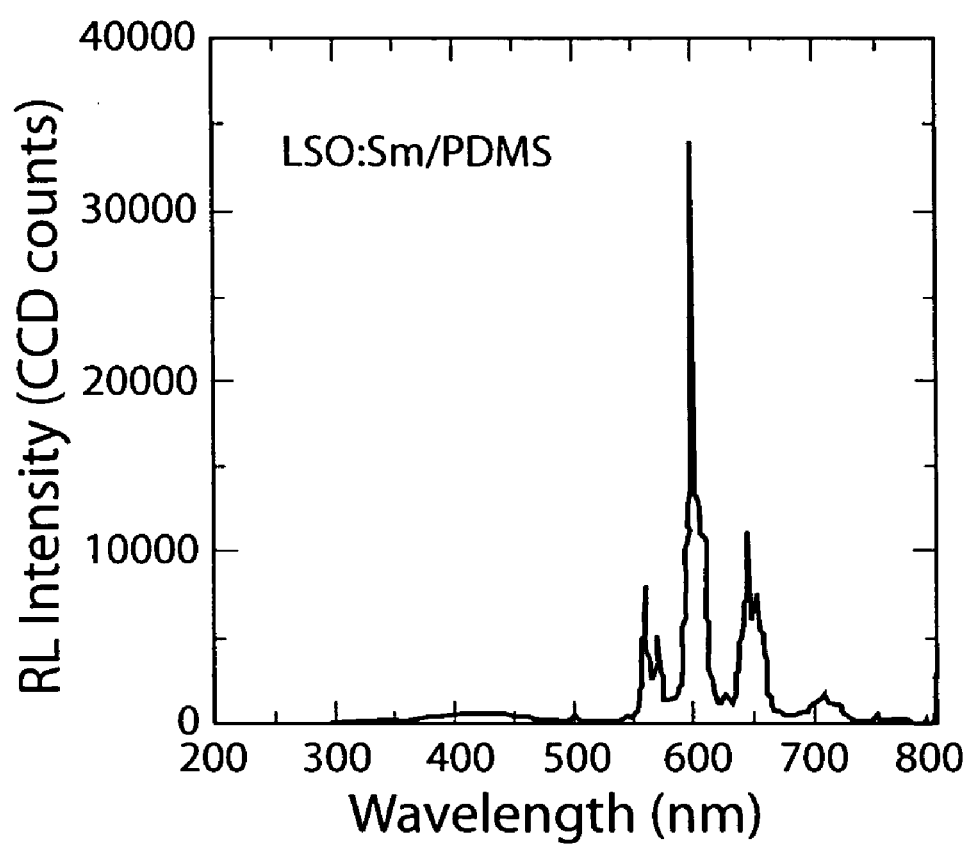
FIG. 2 shows an emission spectrum of a flexible composite of the invention that includes LSO:Sm in PDMS.
Figure 3:
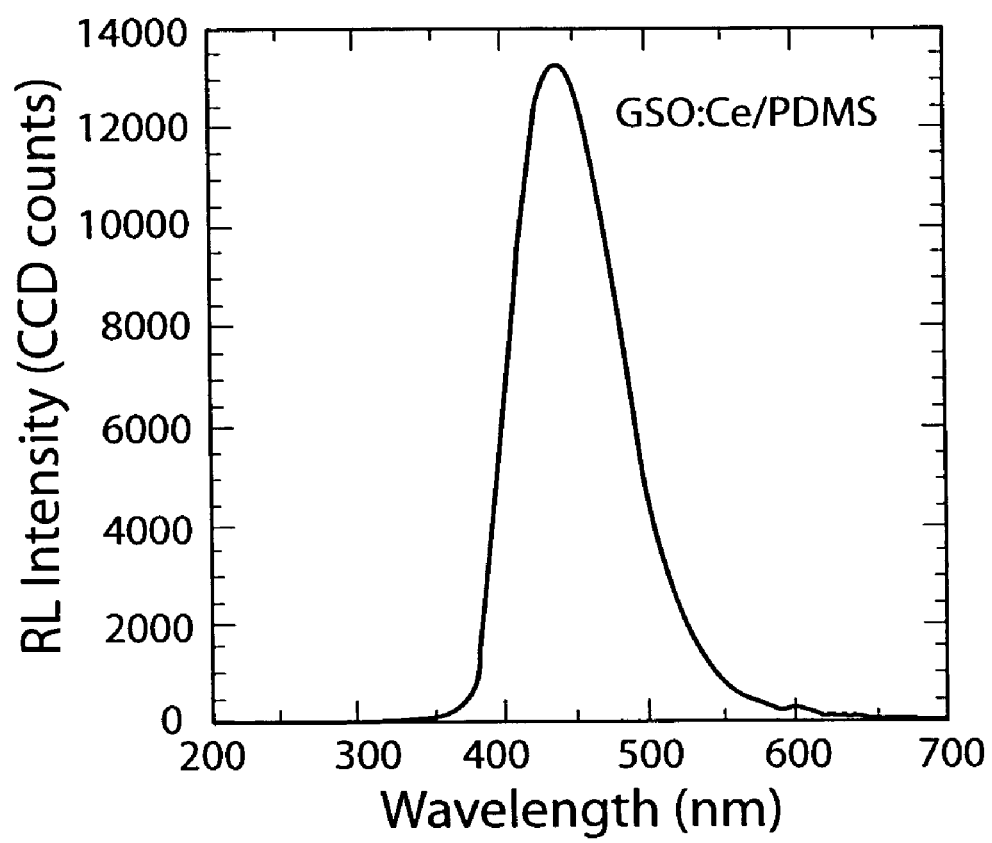
FIG. 3 shows an emission spectrum of a flexible composite of the invention that includes GSO:Ce in PDMS.
Figure 4A:
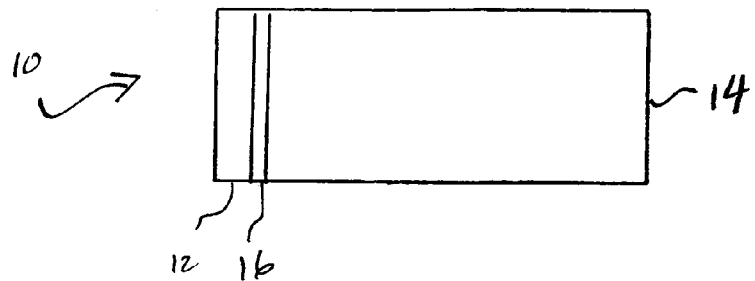
FIG. 4a–d show schematic representations of some possible radiation detector configurations of the present invention.
Figure 4B:
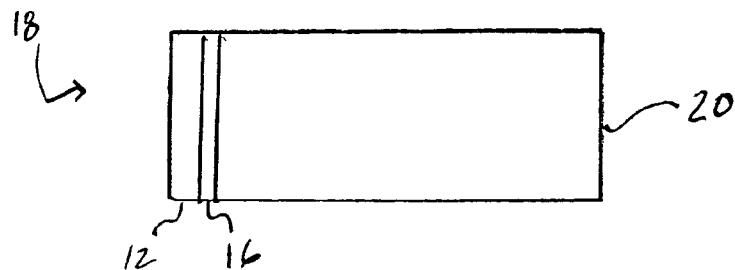
Figure 4C:
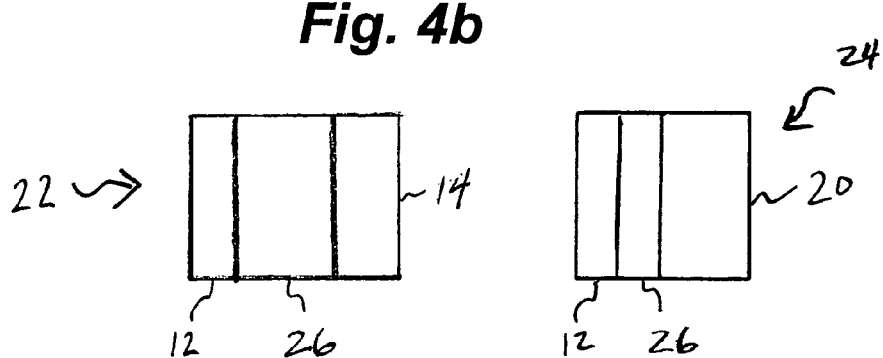
Figure 4D:
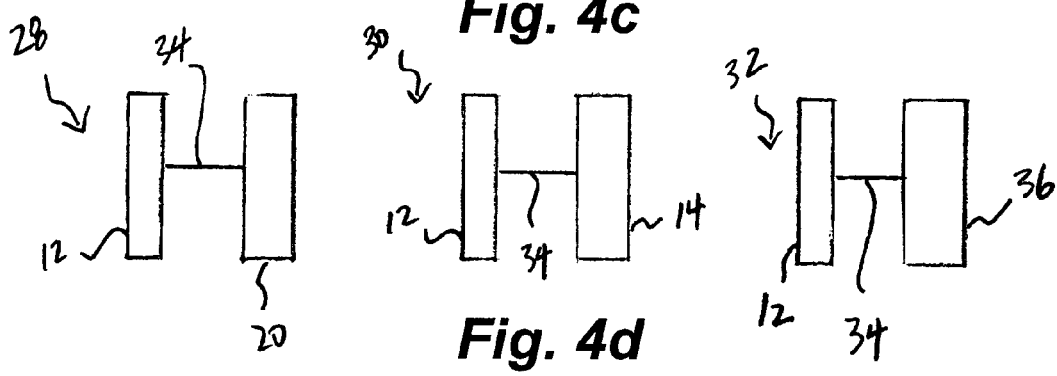

Some of the possible radiation detector configurations include mounting the flexible composite scintillator 12 directly onto the face of a photomultiplier 14 with optical coupling grease 16 (see first configuration 10 of FIG. 4a); mounting the flexible composite scintillator 12 directly onto the face of a photodiode 20 with optical coupling grease 16 (see second configuration 18 of FIG. 4b); mounting a large area flexible composite scintillator 12 onto light-pipe material 26 that directs the scintillation light to one or more photomultipliers 14 or photodiodes 20 (see third configuration 22 and fourth configuration 24, respectively, of FIG. 4c); and indirect coupling of the scintillation light to fiber optics 34, which transmits the light to a photodiode 20, photomultiplier 14 or CCD camera 36 (see fifth configuration 28, sixth configuration 30, and seventh configuration 32, respectively, of FIG. 4d). The latter arrangement was employed to measure the scintillation light from the embodiment flexible composite scintillators LSO:Ce/PDMS, LSO:Sm/PDMS, and GSO:Ce/PDMS, and the results are shown in FIG. 1, FIG. 2, and FIG. 3, respectively. The LSO:Ce/PDMS scintillation spectrum of FIG. 1 is identical to the single-crystal LSO:Ce spectrum, demonstrating that the polymer binder is transparent to the scintillation light. Note that peak emission occurs near 420 nm, which matches the optimum optical response of most photomultiplier tubes.

By selecting the appropriate rare earth dopant, the light emission from the radiation detector can be tailored for either a photomultiplier or a photodiode. X-ray and gamma ray detectors based on photomultipliers, for example, may employ $Lu_2SiO_5$ doped with Ce (i.e. LSO:Ce) because the emission maximum of LSO:Ce occurs near a wavelength of about 420 nanometers, which is close to the maximum response of most photomultipliers. On the other hand, if photodiode detection is desired, LSO:Sm would be more preferable because the maximum emission of LSO:Sm occurs near a wavelength of about 600 nanometers, and thus is better matched to the maximum response for most photodiodes. For a radiation detector used for neutron detection, an oxyorthosilicate of gadolinium would be employed because gadolinium has the largest known cross section for thermal neutrons; the decay scheme yields conversion electrons that excite the rare earth dopant to produce scintillations. Accordingly, $Gd_2SiO_5$ doped with Ce (i.e. GSO:Ce) would be employed for a photodetector using photomultipliers, while GSO:Sm would be employed for a photodetector using photodiodes.

The flexible composites are made by mixing rare-earth-doped oxyorthosilicate powder into a heated mixture of polydimethylsiloxane (PDMS), stirring to obtain uniform distribution, compressing the resulting mixture, and allowing it to cool. Typical sizes of embodiment flexible composite are about 0.5–5 mm in thickness and about 100 mm in diameter. Larger area composites can also be made.

PDMS was chosen for its flexible properties and also for its transparency to the dopant emission. Transparency of the PDMS to the dopant emission was confirmed by the emission spectra shown in FIG. 1, FIG. 2, and FIG. 3 for LSO:Ce/PDMS, LSO:Sm/PDMS, and GSO:Ce/PDMS, respectively.

For visualization of the color, a digital camera was used to provide an image of each composite.

Flexible scintillating composite fibers of the invention may be prepared using known fiber extrusion methods. The resulting flexible composite scintillators may be checked for their associated light output by exposure to x-ray radiation and measuring their emission spectra.

Flexible composites and detectors of the present invention may be used for large-area radiation detection portal monitors, shipping containers, and other applications where large area radiation detection is employed. There currently is a need for relatively inexpensive flexible detectors for portal monitors related to the need for increased transportation security at airports, seaports, and bus and rail terminals, especially after the September 11 attack on the World Trade Center. The radiation detectors of this invention may be used for these types of monitors. The invention may also be used in radiation detectors that require complex and irregular shapes.

Scintillating powdered materials used with this invention are preferably rare-earth-doped oxyorthosilicates. Other materials such as crystalline NaI:Tl, BGO, semiconductors, and noncrystalline organic materials may be used but are less preferable because generally they do not simultaneously satisfy the requirements of fast, bright and dense as well as the rare-earth oxyorthosilicates. In addition to LSO:Ce/PDMS, LSO:Sm/PDMS and GSO:Ce/PDMS, other preferable rare earth doped oxyorthosilicates include LYSO:Ce (see U.S. Pat. No. 6,323,489 to K. McClellan entitled "Single Crystal Scintillator," which issued on Nov. 27, 2001, incorporated by reference herein, which describes cerium activated oxyorthosilicate scintillator having the having the general formula $Lu_{(2-x-z)}Y_xCe_zSiO_5$, wherein $0.05 \leq x \leq 1.95$ and $0.001 \leq z \leq 0.02$, which is abbreviated as LYSO:Ce), and the rare earth doped oxyorthosilicates described in U.S. Pat. No. 6,689,298 to Kenneth J. McClellan et al. entitled "Crystalline Rare-Earth Activated Oxyorthosilicate Phosphor," which issued on Feb. 10, 2004, incorporated by reference herein, which describes a variety of single crystal phosphors such lutetium oxyorthosilicate (LSO), gadolinium oxyorthosilicate (GSO), yttrium oxyorthosilicate (YSO), lutetium yttrium (LYSO) phosphor, lutetium gadolinium (LGSO) phosphor, and gadolinium yttrium (GYSO) phosphor that have been doped with rare earth dopants Sm, Tb, Tm, Eu, Yb, and Pr. These rare-earth-doped oxyorthosilicates are preferable due to their tailorable optical emission, high light output and high density. Not only are they bright and dense, they are also fast and therefore can be used in detectors for proton and neutron radiography, for positron emission tomography, and for medical radiography. Current large-area radiographic devices are based on pixelated single crystals. These devices suffer from disadvantages associated with non-uniform light output over the large area of the detector, and from the dark contrast lines that result from the seams between the pixels. By contrast, the flexible composites of this invention have a relatively uniform light output and can be made seamless over a large area, thereby providing solutions to the aforementioned existing problems associated with pixelated detectors.

Another significant problem associated with the production of pixelated detectors relates to the difficulty in producing pixels; some materials, such as the known scintillator $Gd_2SiO_5$:Ce (GSO:Ce) single crystals are micaceous and cannot be easily cut into pixels and polished for use in radiographic imaging. Large area detectors of this invention employing a GSO:Ce scintillating powder would not require GSO:Ce single crystal pixels; the bulk GSO:Ce could be ground into powder, mixed with a flexible polymer binder such as PDMS, and pressed to form a large area, seamless composite that can be used for radiation detection of this invention.

The following EXAMPLES further illustrate the operability of the present invention.

EXAMPLE 1

Preparation of a flexible composite of polydimethylsiloxane and LSO:Ce phosphor. The flexible composite scintillator was prepared using dimethyl methylvinyl siloxane copolymer, (VGM-021, Gelest, Inc.), amorphous silicon dioxide (HMDS-$SiO_2$, Gelest, Inc.) and phosphor powder. The phosphor powder was ground and sieved from a single crystal of LSO:Ce. The fraction that included particles with a diameter of about 40 microns was used. A curing agent (2,4-dichlorobenzoyl peroxide 50% in PDMS) was used to induce cross-linking.

Best results were obtained by adding the LSO:Ce powder to the copolymer and then adding the the silica filler. Materials were mixed using a dual axial mixer at 3500 rpm for 45 seconds followed by cooling in an ice bath.

In a typical preparation, 0.300 grams of LSO:Ce powder was mixed with about 10 grams of the gummy copolymer. Afterward, about 2 grams of the silicon dioxide filler was mixed in increments into the phosphor/copolymer mixture, and then about 0.2 grams of the curing agent was mixed in. The product was then placed between TEFLON sheets with a paper spacer, the spacer width determining the final thickness. The mixture was pressed in between the TEFLON sheets at a pressure of about 6000 psi at a temperature of about 115 degrees Celsius using a Carver hydraulic press equipped with heated platens and constant pressure controller. The press was heated for about 4 hours, and then cooled to room temperature overnight at 6000 psi. After curing, the product was removed and placed in an oven at a temperature of about 150 degrees Celsius for about 4 hours.

EXAMPLE 2

Preparation of flexible composite of polydimethylsiloxane and LSO:Sm phosphor. The experimental procedure described in EXAMPLE 1 was used to prepare the LSO:Sm/PDMS flexible scintillator except LSO:Ce powder was replaced with LSO:Sm powder. FIG. 2 shows the scintillation spectrum of the resulting flexible composite LSO:Sm/PDMS. This spectrum is identical to the spectrum for the single-crystal LSO:Sm, which demonstrates that the polymer binder is transparent to the scintillation light. In addition, the peak emission occurs near 420 nm, which matches the optimum optical response of most photodiodes.

EXAMPLE 3

Preparation of flexible composite of polydimethylsiloxane and GSO:Ce phosphor. The experimental procedure described in EXAMPLE 1 was used to prepare the GSO:Ce/PDMS flexible scintillator except LSO:Ce was replaced with GSO:Ce powder. FIG. 3 shows the scintillation spectrum for the flexible composite GSO:Ce/PDMS. This spectrum is identical to the spectrum for the single-crystal GSO:Ce spectrum, demonstrating that the polymer binder is transparent to the scintillation light.

In summary, flexible composites of fast, bright and dense rare-earth-doped oxyorthosilicate scintillating powder mixed with a flexible polymer matrix binder are prepared and used for radiation detection. The composites can be made as large as desired for large area radiation detectors.

The foregoing description of the invention has been presented for purposes of illustration and description and is not intended to be exhaustive or to limit the invention to the precise form disclosed, and obviously many modifications and variations are possible in light of the above teaching.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A flexible composite comprising a solid mixture of cerium-doped oxyorthosilicate powder and polymer binder.

2. The composite of claim 1 wherein said binder is transparent to light emitted by the cerium-doped oxyorthosilicate powder.

3. The composite of claim 1, wherein said binder comprises polydimethylsiloxane.

4. The composite of claim 1, wherein said oxyorthosilicate comprises a host lattice selected from the group consisting of lutetium oxyorthosilicate (LSO), gadolinium oxyorthosilicate (GSO), yttrium oxyorthosilicate (YSO), lutetium yttrium oxyorthosilicate (LYSO), gadolinium yttrium oxyorthosilicate (GYSO), and lutetium gadolinium oxyorthosilicate (LGSO).

5. The composite of claim 1, wherein the cerium-doped oxyorthosilicate further comprises Sm, Tb, Tm, Eu, Yb, Pr, or mixtures thereof.

6. The composite of claim 1, wherein the doped oxyorthosilicate comprises LSO:Ce, or GSO:Ce.

7. The composite of claim 1, wherein the composite comprises an amount of cerium-doped oxyorthosilicate in the range from greater than about zero weight percent to about 50 weight percent.

8. The composite of claim 1, wherein the rare earth doped oxyorthosilicate powder comprises powder particle sizes in the range of from about 40 nanometers to about 500 microns.

9. A radiation detector comprising a flexible seamless composite that includes cerium-doped oxyorthosilicate powder mixed with polymer binder, and a photodetector optically coupled to the flexible composite for detecting light emitted from the rare earth doped oxyorthosilicate powder.

10. The radiation detector of claim 9, wherein said flexible polymer binder is chosen such that the binder is transparent to the light emitted by the cerium-doped powder embedded in said binder when said composite is exposed to radiation that results in light emission from said cerium-doped powder.

11. The radiation detector of claim 9, wherein said flexible binder comprises polydimethylsiloxane.

12. The radiation detector of claim 9, wherein said oxyorthosilicate comprises a host lattice selected from the group consisting of lutetium oxyorthosilicate (LSO), gadolinium oxyorthosilicate (GSO), yttrium oxyorthosilicate (YSO), lutetium yttrium oxyorthosilicate (LYSO), gadolinium yttrium oxyorthosilicate (GYSO), and lutetium gadolinium oxyorthosilicate (LGSO).

13. The radiation detector of claim 9, wherein the cerium-doped oxyorthosilicate further comprises Sm, Tb, Tm, Eu, Yb, Pr, or mixtures thereof.

14. The radiation detector of claim 9, wherein the rare earth doped oxyorthosilicate comprises LSO:Ce, and or GSO:Ce.

15. The radiation detector of claim 9, wherein the composite comprises an amount of cerium-doped oxyorthosilicate in the range from greater than about zero weight percent to about 50 weight percent.

16. The radiation detector of claim 9, wherein the composite comprises cerium-doped oxyorthosilicate powder having powder particle sizes in the range of from about 40 nanometers to about 500 microns.

17. The radiation detector of claim 9, wherein said photodetector comprises a photomultiplier.

18. The radiation detector of claim 9, wherein said photodetector comprises a photodiode.

* * * * *